United States Patent [19]
Gregory

[11] 3,885,524
[45] May 27, 1975

[54] PORTABLE LIVESTOCK FEEDER/SHELTER

[76] Inventor: Arthur B. Gregory, 101 Cypress St., West Monroe, La. 71291

[22] Filed: Dec. 7, 1973

[21] Appl. No.: 422,831

[52] U.S. Cl. ................................. 119/16; 119/58
[51] Int. Cl. ............................................. A01k 1/00
[58] Field of Search ............ 119/16, 20, 27, 58, 59, 119/60

[56] References Cited
UNITED STATES PATENTS

| 176,677 | 4/1876 | Patterson, Jr. | 119/16 |
|---|---|---|---|
| 269,477 | 12/1882 | Stoner | 119/16 |
| 624,330 | 5/1899 | Heaton | 119/16 |
| 2,797,662 | 7/1957 | Adams | 119/59 UX |
| 3,269,357 | 8/1966 | Rezabek | 119/16 |

*Primary Examiner*—Hugh R. Chamblee
*Attorney, Agent, or Firm*—Norvell E. Von Behren

[57] ABSTRACT

A portable livestock feeder/shelter which has one end generally open and is generally unfloored with a plurality of new and novel feeding means formed within the shelter. The feeding means serve to structurally reinforce the feeder/shelter while providing means for self-feeding various feeds such as hay, grains or the like to the livestock using the shelter.

The feeder means comprises an upper feeder in the form of a horizontal hayloft in combination with a lower feeder which may contain a quantity of grain or other similar material. Also contained in the unique building is storage space for the various vitamins or other items used in the care of the livestock. A portable structure is desirable so that it may be transported with a small tractor from one place on a field to another using skids formed on the structure. The structure can also be moved on public highways with the use of a removable transverse bar and low tendem dolly wheels attached to the posterior portions of the skid bars formed on the bottom of the structure and within limitations placed by law specified in special hauling permits.

12 Claims, 4 Drawing Figures

PATENTED MAY 27 1975 3,885,524

SHEET 1

PORTABLE LIVESTOCK FEEDER/SHELTER

BACKGROUND OF THE INVENTION

This invention relates generally to portable livestock structures and more particularly to a new and novel portable livestock feeder/shelter which can be utilized for the self-feeding of the livestock and which can be relocated to a different portion of the user's field or pasture when conditions dictate such relocation.

In the care and feeding of livestock such as horses, cows, pigs or the like, it is known to provide permanent feeders and permanent shelters for the livestock at various locations on the farm or ranch of the owner. For example, it is known to feed livestock from permanent opened troughs which are generally located near the barn or operational facilities of the farm for easy access of the farmer. It is also known to provide permanent shelters such as stalls, mangers or the like, for the shelter of the livestock with the shelters being either located inside of the owner's barn or in separate buildings all generally located in close proximity to the barn and feeding facilities.

Such feeding and sheltering facilities, while satisfactory for the full-time farmer or ranch owner, generally are not satisfactory for the weekend farmer or horse owner who must resort to other ways to feed and shelter his livestock when he does not own such elaborate facilities such as barns and other sophisticated feeding and shelter facilities. For example, the weekend rancher or horseman may purchase several acres in the country for the express purpose of providing grazing land and exercise areas for his one or two horses which he is able to visit and spend time with only on weekends. In such a case, it becomes a burden for this type of rancher to have to travel daily the large distances to his acreage in order to see that his horses and other livestock are appropriately fed. In cases such as this resort must be made to other means for automatically feeding and sheltering the animals during the time when the owner is not able to attend to this task or during the time when he does not have the financial abilities to hire someone to handle the task for him.

It is known, for example, in the care and feeding of hogs and pigs, to provide portable-type shelters for the care and feeding of the pigs'baby pigs as typified in the U.S. Pat. No. 391,858, issued Oct. 30, 1888 to M.C. & Z.S. Randleman. This type portable pig pen provides a separate area for the baby pigs to lie down and rest whenever the mother pig is lying in the main area of the pig pen thereby preventing the mother pig from rolling over and destroying her baby pigs. Such a portable structure concept, while satisfactory for hogs and pigs, requires constant care and attention by the owner of the pigs inasmuch as the pig pen described contains one floor which must be constantly cleaned of the pig droppings in order to keep illnesses of the pigs at a minimum.

An improvement of this portable-type structure is shown in the U.S. Pat. No. 619,688, issued Feb. 14, 1899 to F.B. Linn which also provides a removable wooden floor which requires constant cleaning as before mentioned. A somewhat similar portable shelter is shown in the U.S. Pat. No. 2,712,677, issued July 12, 1955, to C.M. Hyde which also requires constant care and attention in the form of cleaning inasmuch as this structure utilizes a plywood floor and is generally suitable only for pigs and hogs. In a like manner, the U.S. Pat. No. 1,876,503, issued Sep. 6, 1932, to G.I. Hinsvark teaches a more sophisticated portable pig brooder house containing special compartments for allowing the pigs to have a rest and play area without intrusion of the mother pig. This structure like the beforementioned structures also contains a wooden floor which needs constant care and attention by the owner of the pigs. In addition all of the beforementioned structures are devoid of any automatic self-feeding means which allow the owner of the livestock to be absent from the livestock for a predetermined length of time.

Self-feeding means have been utilized with portable building structures as typified in the U.S. Pat. No. 1,433,777, issued Oct. 31, 1922, to W.R. Brown wherein an open-ended building may be positioned against a pile of hay allowing for the self-feeding of cattle whenever the door on the opposite end of the building is opened. The subject building also has provisions for closing the opened end of the building and utilizing the building as a grain storage building during harvest time. As a result of utilizing this building for grain storage, a floor must of necessity be formed in the building which dictates that whenever the building is used as a self hay feeder for cattle, the building would require constant cleaning from the droppings of the cattle onto the floor of the building. In addition, a building as taught by this patent, only provides for the self-feeding of one type of food and only after the owner has opened the door on the building which requires constant attention of the owner to the feeding of the cattle.

A somewhat modified form of the self-feeder is taught in the U.S. Pat. No. 3,269,357, issued Aug. 30, 1966, to E.A. Rezabek wherein there is provided a portable hog and pig feeder which contains individual self-feeding troughs for the sow and also for the baby pigs. This feeder also contains a floor that needs constant cleaning from the pig droppings, however, easy access to the building for cleaning purposes is provided by hinging the building as shown in FIG. 8 of the drawings.

SUMMARY OF THE INVENTION

In order to overcome the problems and difficulties inherent in the prior art structures hereinbefore described and in order to provide a more suitable structure for the self-feeding of livestock, there is provided by the subject invention a new and novel portable livestock feeder/shelter which is formed as a generally enclosed structure having one end generally open with the structure being generally unfloored. The structure has formed on the bottom thereof a skid surface which allows the structure to be easily moved from one location to another location within the field or pasture of the owner of the shelter so that whenever the animal droppings accumulate within the shelter, the shelter may be readily moved to another location. This feature also is advantageous in that the formation of mud deposits commonly found around feeding areas and the proliferation of intestinal parasites is largely avoided since the shelter may be readily moved.

Formed within the new and novel portable structure are upper feeder means in the form of a generally horizontal hayloft which is formed in the upper portion of the structure with the hayloft having means for dispensing hay from the loft to the livestock using the structure. Also formed on the structure are lower feeder means in the form of a generally enclosed grain bin which has formed on the interior and lower portion thereof means for dispensing the grain stored within the bin to the livestock using the structure.

Accordingly it is an object of the invention to provide a new and novel portable livestock feeder/shelter which is constructed as a generally enclosed structure having one open end with the structure being unfloored thereby alleviating the cleaning problems inherent in prior art structures.

Another object of the invention is to provide a new and novel portable livestock feeder/shelter which contains a plurality of feeder means for providing automatic feeding means to the livestock using the structure.

Yet another object of the invention is to provide a new and novel portable livestock feeder/shelter which utilizes a plurality of feeder means as an integral part to reinforce the shelter thereby eliminating the need for special interior structural supports and cross-bracings.

Still yet another object of the invention is to provide a new and novel portable livestock feeder/shelter which may be easily transported from one position to another position in the owner's pasture and also may be easily transported by means of removable wheels over the highways from one location to another location.

Yet another object of the invention is to provide a new and novel portable livestock feeder/shelter which may be easily prefabricated and sold in a kit form for assembly by a weekend farmer or rancher having a specific need for such a portable feeder/shelter.

Another object of the invention is to provide a novel feeder/shelter that has unique crossbar gates at appropriate levels across the open end of the structure which allows the structure to be used as a creep feeder for colts or calves.

A further object is to provide torsional stability to the structure by the use of the "U"-shaped steel skid taught by the preferred embodiment.

These and other objects and advantages of the invention will become apparent from a review of the drawings showing the preferred embodiment and from a study of the description detailing the preferred embodiment.

DESCRIPTION OF THE PREFERRED EMBODIMENT

Figure 1:
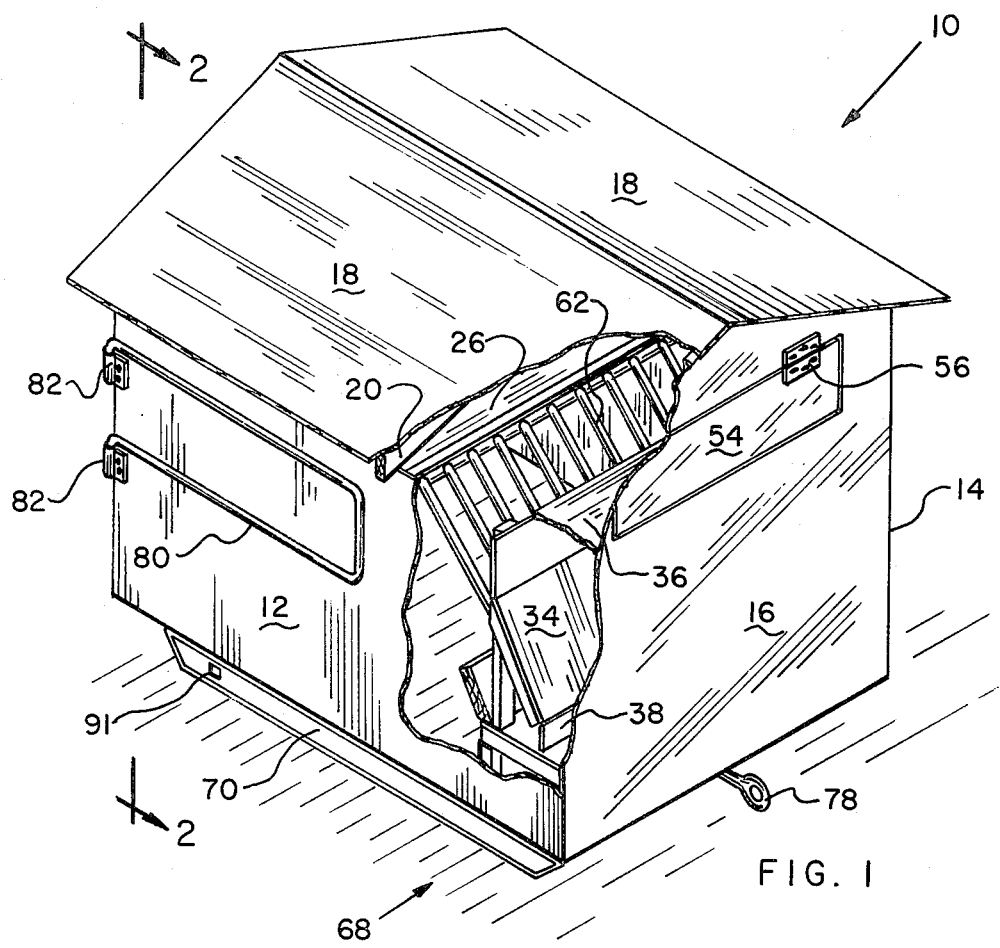
FIG. 1 is a perspective view of the new and novel portable livestock feeder/shelter with a corner of the shelter shown broken away to detail the upper and lower feeder means of the subject invention.
Figure 3:
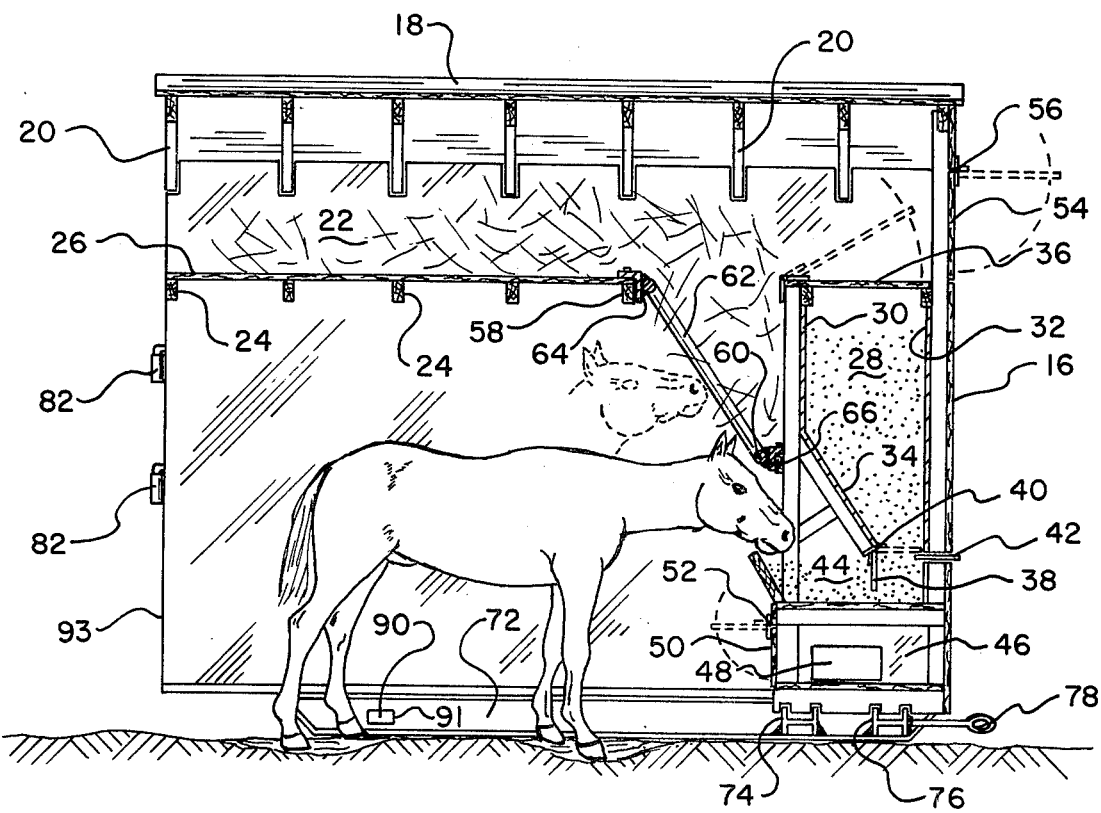
FIG. 3 is a section view, taken along Line 3—3 of FIG. 2, showing the upper feeder means in the form of a hayloft and also showing the lower feeder means in the form of a grain bin with both feeder means having dispensing means contained therein for dispensing the hay or grain contained within the respective feeders.

Referring now generally to the drawings and in particular to FIGS. 1 and 3 of the drawings there is shown in FIG. 1, generally by the numeral 10, the portable livestock feeder/shelter of the subject invention which comprises a generally enclosed structure comprising a pair of side walls 12 and 14 fixedly attached to an end wall 16 by means well known in the art. Also fixedly attached to the side walls 12 and 14 and the end wall 16 is a roof 18 formed of plastic or other suitable roofing material. In the preferred embodiment, the roof 18 is formed of known translucent plastic materials to allow more light to be present within the portable feeder/shelter 10. The roof 18 is supported by a plurality of roof joists 20 by means well known in the art and is fixedly attached to the side walls 12 and 14 and also the end wall 16 by known fastening means.

The generally enclosed structure 10 is generally open on the end opposite the end wall 16 and also contains no floor as is usually contained in the before-mentioned prior art structures. Formed in the upper portion of the shelter 10 is an upper feeder means 22 in the form of a generally horizontal hayloft which is formed by fixedly attaching a plurality of wooden beams 24 between the side walls 12 and 14 and fixedly attaching thereto a plywood floor 26.

By referring to FIG. 3 of the drawing it will be seen that the hayloft or upper feeder means 22 extends approximately two-thirds of the length of the feeder/shelter for the purposes which will be detailed more fully hereinafter. Also referring to FIG. 3 of the drawing, it will be noticed that there is formed in the forward portion of the shelter a lower feeder means 28 in the form of a generally enclosed grain bin having a pair of elongated sides 30 and 32 with a sloped bottom portion 34 and a hinged filler door 36 pivotally mounted by means well known in the art to the upper portion of the grain bin. Formed on the lower portion of the grain bin or lower feeder means 28 is a dispensing valve 38 in the form of an elongated gate which is hingedly attached at 40 to the sloped bottom portion 34 of the grain bin. The valve 38 serves as a means for automatically dispensing grain to the livestock using the structure whenever the valve is shown in the vertical solid position shown in FIG. 3. When it is desired to control the amount of grain flowing from the grain bin 28, the valve 38 may be positioned in the horizontal position shown by the dash line in FIG. 3 and held in place by means of a movable stop 42.

Formed beneath the grain bin 28 is an open trough 44 which serves as a receptacle for the grain flowing from the grain bin 28 by means of gravity flow. The trough 44 is formed on the top of a storage means 46 which may be utilized to store a plurality of salt blocks 48 or the various vitamins used in the care and feeding of livestock. Access to the storage means 46 is provided by a door 50 which is hinged by means of a pair of hinges 52 to the inside trough support wall 53. When formed in this manner the door 50 may be hinged upwardly to the generally horizontal position shown in FIG. 3 of the drawing to provide access to the storage means 46 and may also contain locking means for locking the contents of the storage means from unwanted intrusion by other than the owner of the structure. Access to the grain bin 28 for purposes of filling the bin with grain is provided by means of a hinged door 54 which is hinged by a plurality of hinges 56 fixedly attached to the upper portion of the end wall 16. When formed in this manner, the door 54 may be swung upwardly to the generally horizontal position shown FIG. 3 to provide access to the grain bin 28 whenever the grain bin filler door 36 is hinged upwardly in the inclined position shown by the dash lines in FIG. 3 of the drawings. By forming the grain bin filler door 36 in the top of the grain bin 28, more grain may be stored in the grain bin allowing the feeder/shelter to be used for a greater length of time without refilling the grain bin.

As before mentioned the hayloft 22 extends approximately two-thirds of the length of the feeder/shelter and has formed between the end 58 of the hayloft and the central portion 60 of the grain bin a generally elongated grill or grating 62 which serves to allow a portion of the hay contained in the hayloft to be exposed to the livestock utilizing the shelter so that they can reach upwardly and eat the hay contained in the hayloft. The grill 62 is fixedly attached to the end of the hayloft 58 by means of an angle bracket 64 and is fixedly attached to the central portion 60 of the grain bin by means of an angle bracket 66.

Figure 2:
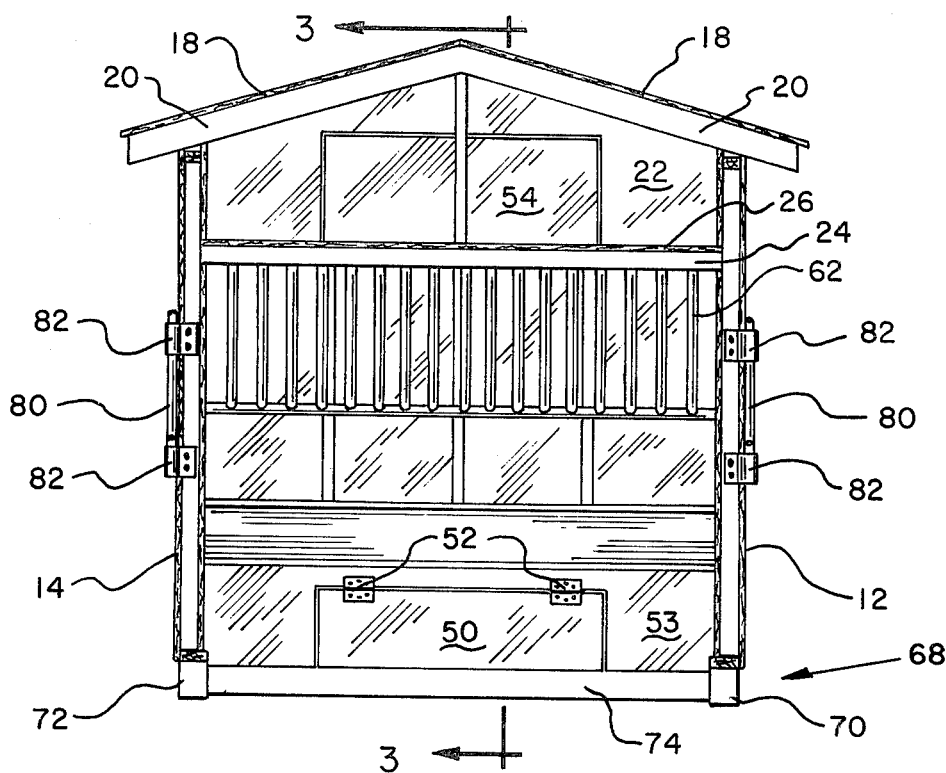
FIG. 2 is an end view of the new and novel portable livestock feeder/shelter, taken along Line 2—2 of FIG. 1, showing the interior of the subject shelter.

Referring now generally to FIGS. 1, 2 and 3 it will be seen that the feeder/shelter of the subject invention has formed on the bottom thereof a skid surface in the form of a "U"-shaped skid shown generally by the numeral 68 which comprises a pair of steel side channels 70 and 72 which are welded to a pair of end channels 74 and 76 by means well known in the art. The end channel 76 has welded thereto an eyelet 78 extending generally horizontal to the ground and extending in front of the end wall 16 for the purposes which will be described more fully hereinafter.

From a review of the drawing FIGS. 1 through 3 it can be seen that the side channels 70 and 72 generally support the side walls 12 and 14 which are attached thereto by means of a plurality of bolts not shown in the drawing and the end channels 74 and 76 generally support the grain bin structure 28 as well as the storage means 46 and the contents of the material contained in the grain bin and the storage means. Since the grain bin 28 generally is constructed running the entire width of the feeder/shelter 10 and is fixedly attached to the side walls 12 and 14 as shown in FIG. 1 of the drawing, it can be seen that the grain bin 28 adds structural support to the feeder/shelter structure in combination with the hayloft 22 which also generally runs the entire width of the feeder/shelter structure and is also rigidly attached to the side walls 12 and 14.

Formed on the open ended portion of the structure 10 and pivotally mounted thereto are restraining means 80 in the form of a pipe rail which is carried by means of the pipe brackets 82. The restraining means 80 may be utilized to close off the open end of the structure 10 to prevent unwanted livestock from entering the feeder/shelter whenever this is desirous. For example whenever the owner of the shelter wishes to allow baby calves to feed in the feeder/shelter without allowing the larger cows access to the feed, he simply closes the pipe gate across the end of the structure 10 after the calves have entered the feeder. Whenever the calves have finished feeding, the pipe gate 80 can be swung open to allow the remaining cattle to use the shelter without hindering the feeding of the young calves. The pipe gates 80 may also be formed as a single gate spanning the open end within the spirit and scope of the invention.

While in the preferred embodiment the grain bin 28 is constructed as one elongated grain bin running the entire width of the end wall 16, it is also within the spirit and scope of the invention that the grain bin 28 could be subdivided into a series of smaller grain bins by means of a plurality of vertical partitions inserted within the grain bin thereby allowing the grain bin to be utilized to handle various types of grains such as oats, corn, barley or the like if this is desired by the owner. With a modification such as this, each grain bin would have its own dispensing valve 38 for dispensing the particular grain contained within that bin. In the preferred embodiment it is also advantageous to construct the grain bin 28 by lining it with sheet metal to prevent access to the bins from rats, field mice or the like. The sheet metal would be applied to the inside of the bin on sides 30, 32, 34 as well as to the underside of the filler door 36 and to the inside surface of the valve 38. In addition sheet metal would be applied to the ends of the grain bin where the grain bin is fixedly attached to the side walls 12 and 14. When constructed thusly, the entire grain bin is sheet-metal enclosed which prevents rodents from entering the grain bin and feeding on the grain contained in the bin as long as the valve means 38 is in the generally horizontal position shown by the dash line in FIG. 3.

Figure 4:
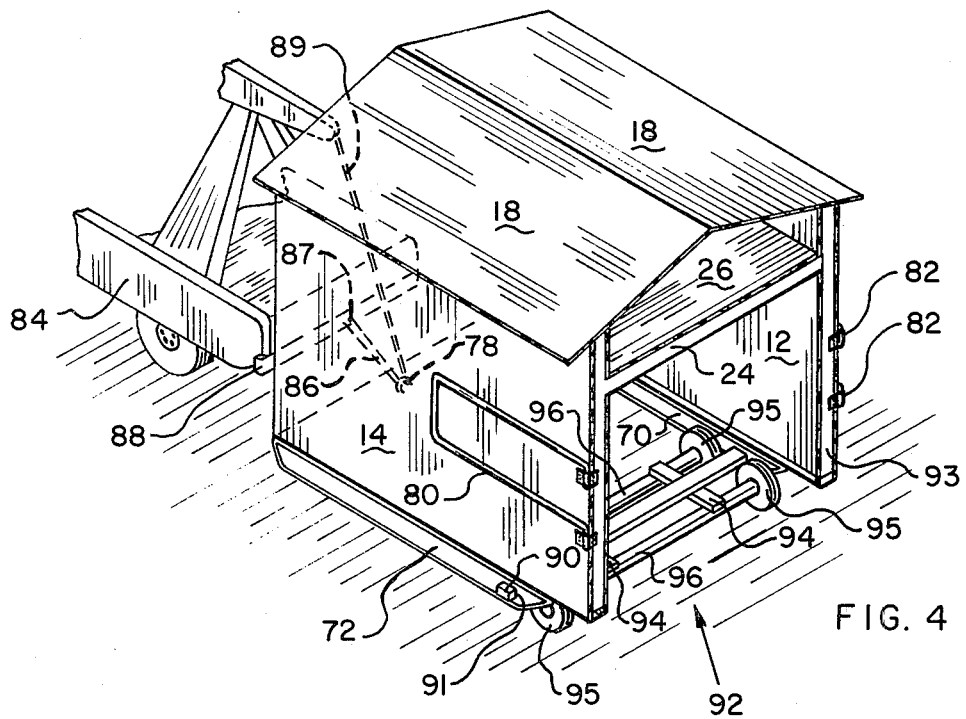
FIG. 4 is a perspective view of the new and novel portable livestock feeder/shelter showing the shelter being moved with a wrecker truck and by means of the portable wheels removably attached to the inside of the structure.

Referring now to FIG. 4 of the drawing there is shown a perspective view of the new and novel portable feeder/shelter showing the shelter attached to a wrecker truck 84 by means of a solid bar 86 which is removably attached at 87 to the pickup truck bumper 88 on one end and also is removably attached to the generally horizontal eyelet 78 fixed to the end channel 76. Prior to this the wrecker truck 84 had lifted the closed end of the shelter off of the ground by means of the wrecker chain 89 as shown in FIG. 4.

Whenever it is desirous to move the portable feeder/shelter over a highway, a beam or steel rod 90 is positioned in a pair of mating holes 91 formed in the rear portion of the side channels 70 and 72 as shown in FIG. 4 of the drawing. Thereupon a portable removable wheel means, shown generally by the numeral 92 may be inserted underneath the beam 90 after the open end 93 of the feeder/shelter has been raised in the air by well known lifting means a sufficient amount to allow the beam 90 to rest upon a pair of bars 94 rigidly attached to a pair of tandum dolly wheels 95 which are in turn rotatably mounted on axles 96. By raising the front end of the portable feeder/shelter off of the ground a sufficient amount by means of the chain 89, it can be seen that the entire structure can be transported over the highways by means of the wrecker truck 84 to a desired location whereupon the chain 89 and the bar 86 are removed and the portable wheel means 92 is also removed from the structure along with the beam 90.

Thereafter whenever it is desirous to relocate the structure to another part of the pasture the wrecker truck 84 or some other means such as a tractor can simply pull the structure after fastening a chain to the horizontal eyelet 78. Since the structure has formed on the bottom thereof a skid surface such as the generally "U"-shaped skid 68, it is unnecessary to utilize the portable wheel means 92 whenever relocating the structure within the owner's field or pasture. By forming the structure without a floor, cleaning of the structure becomes unnecessary inasmuch as the structure can be towed to a clean area whenever the droppings from the livestock have accumulated sufficiently on the ground within the shelter enclosure.

It has been found from experimentation that whenever the feeder/shelter is formed so that the width of the end wall 16 is approximately 10 to 12 feet and the length of the side walls 12 and 14 is approximately 15 feet, then the feeder has capabilities of being able to self-feed, for example, two horses for a period of from one to two weeks with at least 20 bales of hay being able to be stored in the hayloft and possibly 1000 pounds of grain being stored in the grain bin. From the foregoing it can be seen that there has been provided by the subject invention a new and novel portable livestock feeder/shelter which may be easily contructed and also may be easily prefabricated for shipment to the livestock owner. The subject structure contains a plurality of unique feeding means which serve as self-feeders for the livestock utilizing the structure and also serve as structural reinforcements to the outside shell of the structure. The unique feeder/shelter of the subject invention may be positioned at one location in the owner's pasture and may be easily relocated to another position by pulling the structure on the self-contained skids or skid surface formed on the bottom thereof thereby eliminating the necessity for cleaning the structure from the droppings of the livestock utilizing the structure. The position and location of the hayloft and grain feeder tends to insure that the droppings from the animals using the shelter are located away from the grain feed bin and near the open end of the shelter and not in the animals' grain feed bin as is common in other types of shelter. The subject structure may also be easily transported from one location to a remote location over the highways by using the portable wheel means which are easily positioned underneath the structure.

It should now become obvious that the objects and advantages of the invention have been accomplished by the new and novel structure herein taught. Nevertheless, it is apparent that many changes may be made in the structure and in the arrangement of the parts of the structure without departing from the spirit and scope of the invention, and the invention is not to be limited to the preferred embodiment shown and described which has been given by way of illustration only.

Having described the invention, I claim:

1. A portable livestock unfloored feeder/shelter comprising
   a partially enclosed and unfloored upright structure mounted on underlying surface means and having opposed and spaced side wall means, end wall means having inside surface means and extending between and connected to the opposed side wall means, roof means extending between and connected to the end wall means and the opposed side wall means;
   said structure having an open end for free ingress and egress of livestock and disposed between the opposed side wall means and between said roof means and the underlying surface means, the open end being arranged in opposed and spaced relation to the end wall means;
   hayloft means disposed beneath said roof means and extending between and connected to the opposed side wall means, said hayloft means extending in a direction from the open end toward but spaced from the end wall means;
   grain bin and feeder means mounted on the inside surface means of the end wall means and extending between and connected to the opposite side wall means;
   grate means for dispensing hay from the hayloft means to livestock extending between and connected to the opposed side wall means and between and connected to said hayloft means and side grain bin and feeder means; and
   said hayloft means, said grain bin and feeder means and said grate means rigidifying said structure so as to maintain the integrity of said structure throughout normal use of said structure at a location and movement of said structure from one location to another.

2. The feeder/shelter as defined in claim 1 further comprising said grain bin and feeder means having an upper portion and a lower portion, a filler door attached to the upper portion and the lower portion including valve means for controlling the flow of grain out of the grain bin and feeder means.

3. The feeder/shelter as defined in claim 2 further comprising said grain bin and feeder means including an open trough formed under the valve means for receiving the grain, the trough being disposed beneath said grate means.

4. The feeder/shelter as defined in claim 2 further comprising said grain bin and feeder means having an interior and an inside lining of sheet metal for sealing the interior of the grain bin and feeder means.

5. The feeder/shelter as defined in claim 2 further comprising said structure having an exterior access door for access to the filler door and for effecting filling of the grain bin and feeder means.

6. The feeder/shelter as defined in claim 1 further comprising storage means formed below said grain bin and feeder means.

7. The feeder/shelter as defined in claim 6 futher comprising door means formed on the storage means to provide access to the storage means.

8. The feeder/shelter as defined in claim 1 wherein said underlying surface means includes U-shaped skid means mounted on bottom edges of said opposed wall means.

9. The feeder/shelter as defined in claim 8 wherein towing and lifting means is connected to the end wall means for effecting movement of said structure from one location to another.

10. The feeder/shelter as defined in claim 8 wherein removable wheel means is mounted on said structure for effecting movement of said structure from one location to another.

11. The feeder/shelter as defined in claim 1 wherein said structure has an interior between the opposed side wall means; and restraining means is mounted on at least one of the opposed side wall means for selectively closing the open end of said structure so as to prevent the entrance of livestock into the interior of said structure.

12. The feeder/shelter as defined in claim 11 wherein said restraining means includes a gate hingedly attached to one of the opposed side wall means.

* * * * *

UNITED STATES PATENT OFFICE
CERTIFICATE OF CORRECTION

PATENT NO. : 3,885,524
DATED : May 27, 1975
INVENTOR(S) : Arthur B. Gregory

It is certified that error appears in the above-identified patent and that said Letters Patent are hereby corrected as shown below:

In the Specification, Col.1, Line 59 - Change "Feb." to —February—

In Claim 1, Col.8, Line 9 - Change "side" to —said—

Signed and Sealed this thirteenth Day of April 1976

[SEAL]

Attest:

RUTH C. MASON
Attesting Officer

C. MARSHALL DANN
Commissioner of Patents and Trademarks